United States Patent [19]

Luo

[11] Patent Number: 6,117,956
[45] Date of Patent: *Sep. 12, 2000

[54] CATALYST COMPOSITION AND POLYMERIZATION PROCESS FOR PRODUCING SYNDIOTACTIC 1,2-POLYBUTADIENE

[75] Inventor: Steven Luo, Akron, Ohio

[73] Assignee: Bridgestone Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/088,611

[22] Filed: Jun. 1, 1998

[51] Int. Cl.$^7$ .............................. C08F 4/06; C08F 36/00; B01J 31/00
[52] U.S. Cl. .......................... 526/145; 526/135; 526/335; 502/102; 502/103; 502/117; 502/118; 502/120; 502/121; 502/150; 502/152; 502/153; 502/154; 502/155; 502/162; 502/171; 502/208; 502/210
[58] Field of Search ........................... 502/102, 103, 502/117, 118, 120, 121, 150, 152, 153, 154, 155, 162, 171, 208, 210; 526/135, 145, 335

[56] References Cited

U.S. PATENT DOCUMENTS

| | | | |
|---|---|---|---|
| 3,498,963 | 3/1970 | Ichiwara et al. | 260/94.3 |
| 3,725,373 | 4/1973 | Yoo | 260/88.7 |
| 3,778,424 | 12/1973 | Suguira et al. | |
| 3,957,894 | 5/1976 | Saeki et al. | 260/666 |
| 4,048,418 | 9/1977 | Throckmorton et al. | 526/138 |
| 4,148,983 | 4/1979 | Throckmorton | 526/139 |
| 4,168,357 | 9/1979 | Throckmorton et al. | |
| 4,168,374 | 9/1979 | Throckmorton et al. | |
| 4,182,813 | 1/1980 | Makino et al. | |
| 4,379,889 | 4/1983 | Ashitaka et al. | 525/247 |
| 4,410,672 | 10/1983 | Inazawa | 526/124 |
| 4,751,275 | 6/1988 | Witte et al. | |
| 5,239,023 | 8/1993 | Hsu et al. | 525/141 |
| 5,283,294 | 2/1994 | Hsu et al. | 525/247 |
| 5,356,997 | 10/1994 | Massie et al. | 525/237 |
| 5,677,405 | 10/1997 | Goodall et al. | 526/281 |
| 5,891,963 | 4/1999 | Brookhart et al. | 525/326.1 |
| 5,919,875 | 7/1999 | Luo et al. | 526/139 |

FOREIGN PATENT DOCUMENTS 48-64178 of 1973 Japan.
48-6939 of 1973 Japan.

OTHER PUBLICATIONS

Hidetomo Ashitaka, Hideo Ishikawa, Haruo Ueno, and Akira Nagasaka, Syndiotactic 1,2–Polybutadiene With Co–CS$_2$ Catalyst System. 1. Preparation, Properties, and Application of Highly Crystalline Syndiotactic 1,2–Polybutadiene, Journal of Polymer Science: Polymer Chemistry Edition, vol. 21, 1853–1860 (1983).
U.S. Ser. No. 09/439,861, filed on Nov. 12, 1999.
U.S. Ser. No. 08/996,656, filed on Dec. 23, 1997.
U.S. Ser. No. 09/173,956, filed on Oct. 14, 1998.
U.S. Ser. No. 09/172,305, filed on Oct. 14, 1998.
U.S. Ser. No. 09/172,346, filed on Oct. 14, 1998.
U.S. Ser. No. 09/328,549, filed on Jun. 9, 1999.
U.S. Ser. No. 09/434,669, filed on Nov. 5, 1999.
U.S. Ser. No. 09/434,625, filed on Nov. 5, 1999.
U.S. Ser. No. 09/475,343, filed on Dec. 30, 1999.
U.S. Ser. No. 09/475,345, filed on Dec. 30, 1999.
U.S. Ser. No. 09/475,547, filed on Dec. 30, 1999.
U.S. Ser. No. 09/475,723, filed on Dec. 30, 1999.

*Primary Examiner*—Elizabeth D. Wood
*Attorney, Agent, or Firm*—David G. Burleson; Daniel N. Hall; Arthur M. Reginelli

[57] ABSTRACT

The instant invention teaches a method for forming a syndiotactic 1,2-polybutadiene product having a higher syndiotacticity and a higher melting temperature than syndiotactic 1,2-polybutadiene produced using chromium catalysts known in the prior art. The method includes polymerizing 1,3-butadiene in solution with a solvent, in the presence of catalytically effective amounts of: (a) a chromium compound; (b) an organomagnesium compound; and, (c) a cyclic hydrogen phosphite.

23 Claims, No Drawings

CATALYST COMPOSITION AND POLYMERIZATION PROCESS FOR PRODUCING SYNDIOTACTIC 1,2-POLYBUTADIENE

FIELD OF THE INVENTION

The present invention relates to a catalyst composition and its use in the production of syndiotactic 1,2-polybutadiene.

BACKGROUND OF THE INVENTION

Many transition metal catalyst systems based on titanium, vanadium, chromium, molybdenum, palladium, and cobalt have been reported in the prior art for the preparation of syndiotactic 1,2-polybutadiene (see, e.g., J. Boor, Jr., Ziegler-Natta Catalysts and Polymerizations, Academic Press: New York, 1979, P. 144). However, the majority of these catalyst systems have no industrial application because they have insufficient polymerization activity and stereoselectivity and in some cases produce low molecular weight polymers or cross-linked polymers unsuitable for commercial use. The following cobalt-containing catalyst systems are well known for the preparation of syndiotactic 1,2-polybutadiene:

I. Cobalt dibromide/triisobutyl aluminum/water/triphenyl phosphine (Jap. Kokoku 44-32426, U.S. Pat. No. 4,182,813 (1/8/1980), assigned to Japan Synthetic Rubber Co. Ltd.) and II. Cobalt tris(acetylacetonate)/triethyl aluminum/water/carbon disulfide (U.S. Pat. No. 3,778,424 (1970), Jap. Kokoku 72-19,892, 81-18,127, 74-17,666, 74-17,667; Jap. Kokai 81-88,408, 81-88,409. 81-88,410, 75-59,480, 75-121, 380, 75-121,379, assigned to Ube Industries Ltd.).

These two catalyst systems also have serious disadvantages. The cobalt dibromide/triisobutyl aluminum/water/triphenyl phosphine system yields syndiotactic 1,2-polybutadiene having very low crystallinity. In addition, this catalyst system develops sufficient catalytic activity only in halogenated hydrocarbon solvents as polymerization medium, and halogenated solvents present the problems of toxicity. The cobalt tris(acetylacetonate)/triethyl aluminum/water/carbon disulfide system uses carbon disulfide as one of the catalyst components, thereby necessitating the use of special safety measures due to its high volatility, low flash point as well as toxicity. Furthermore, the syndiotactic 1,2-polybutadiene produced with this catalyst system has very high melting point (200–210° C.) and is therefore difficult to process. Accordingly, many restrictions are required for the industrial utilization of the two said catalyst systems of the prior art.

Coordination catalysts based on chromium compounds such as triethylaluminum/chromium tris(acetylacetonate) have low activity and give rise to low molecular weight polymers and therefore have not been usable on a commercial scale. Japanese patents JP-A-7306939 and JP-A-7364178, both assigned to Mitsubishi, disclose a process for polymerization of 1,3-butadiene to amorphous 1,2-polybutadiene by using a ternary catalyst system comprising: (a) a soluble chromium compound, (b) a trialkyl aluminum compound, and (c) a dialkyl hydrogen phosphite. The product was reported to be a white rubbery polymer which contained a portion of gel and displayed no obvious melting point. U.S. Pat. No. 4,751,275, assigned to Bayer, discloses a process for the preparation of syndiotactic 1,2-polybutadiene by solution polymerization of 1,3-butadiene in a hydrocarbon polymerization medium. The catalyst used in this solution polymerization contains a chromium-III compound which is soluble in hydrocarbons, a trialkylaluminum compound, and dineopentyl phosphite or neopentylmethylphosphite. However, the polymerization product was not well characterized as neither the melting temperature nor the degree of syndiotacticity is reported.

U.S. Pat. No. 4,168,357 and U.S. Pat. No. 4,168,374, both assigned to Goodyear, describe chromium-containing catalysts for the prepartion of high cis-1,4-polypentadiene.

Notwithstanding the foregoing prior art, it would be advantageous to develop a new and improved catalyst system that can be used to produce a syndiotactic 1,2-polybutadiene product having a higher melting temperature and increased syndiotacticity compared to the syndiotactic 1,2-polybutadiene produced by the processes of the prior art.

OBJECTS OF THE INVENTION

The object of this invention is to overcome the disadvantages of the prior art and to provide a new and improved catalyst system for the preparation of syndiotactic 1,2-polybutadiene having a higher melting temperature and increased syndiotacticity over syndiotactic 1,2-polybutadiene products of the prior art.

More specifically, it is an object of the present invention to develop a process for the polymerization of 1,3-butadiene to syndiotactic 1,2-polybutadiene using a ternary catalyst system comprising: (a) a soluble chromium compound, (b) an organomagnesium compound, and (c) a cyclic hydrogen phosphite.

DETAILED DESCRIPTION OF THE INVENTION

The present invention relates to a process for producing syndiotactic 1,2-polybutadiene by polymerizing 1,3-butadiene in the presence of a catalyst system comprising: (a) a hydrocarbon-soluble chromium compound; (b) an organomagnesium compound, and (c) a cyclic hydrogen phosphite.

The chromium compound employed in the catalyst system of the instant invention is soluble in a hydrocarbon solvent such as aromatic hydrocarbons, aliphatic hydrocarbons, or cycloaliphatic hydrocarbons and includes, but is not limited to, chromium carboxylates such as chromium 2-ethylhexanoate, chromium neodecanoate, chromium naphthenate, chromium stearate, chromium oleate, and chromium benzoate; chromium β-diketonates such as chromium tris(acetylacetonate), chromium tris(trifluoroacetylacetonate), chromium tris(hexafluoroacetylacetonate), chromium tris(benzoylacetonate), and chromium tris(2,2,6,6-tetramethyl-3,5-heptanedionate); chromium alkoxides or aryloxides such as chromium ethoxide, chromium isopropoxide, chromium 2-ethyl-hexoxide, chromium phenoxide, chromium nonylphenoxide, and chromium naphthoxide; and organochromium compounds such as tris(allyl)chromium, tris(methallyl)chromium, tris(crotyl)chromium, bis(cyclopentadienyl)chromium (also called chromocene), bis(pentamethylcyclopentadienyl)chromium (also called decamethylchromocene), bis(benzene)chromium, bis(ethylbenzene)chromium, and bis(mesitylene)chromium.

The organomagnesium compound employed in the catalyst system of the instant invention is a dihydrocarbyl magnesium compound or a hydrocarbon-soluble Grignard reagent. The dihydrocarbyl magnesium compound is represented by the formula $MgR_2$ where each R, which may be the same or different, is for example, an alkyl, cycloalkyl, aryl, aralkyl, or allyl group; each group preferably containing from 1 or the appropriate minimum number of carbon atoms to form such group up to 20 carbon atoms. Examples of such dihydrocarbyl magnesium compounds are diethyl magnesium, di-n-propyl magnesium, diisopropyl magnesium, dibutyl magnesium, dihexyl magnesium, diphenyl magnesium, and dibenzyl magnesium. Preferably, the organomagnesium compound is soluble in hydrocarbon polymerization medium. Dibutyl magnesium is particularly preferred on the grounds of availability and solubility. The hydrocarbon-soluble Grignard reagent is represented by the formula RMgX where R is a hydrocarbyl group such as exemplified above and X is fluorine, chlorine, bromine or iodine. Included but not limited to this group of RMgX catalyst components are methylmagnesium chloride, methylmagnesium bromide, methylmagnesium iodide, ethylmagnesium chlodide, ethylmagnesium bromide, butylmagnesium chloride, butylmagnesium bromide, phenylmagnesium chloride, phenylmagnesium bromide, and benzylmagnesium chloride.

The cyclic hydrogen phosphite employed in the catalyst system of the present invention is a cyclic alkylene hydrogen phosphite or a cyclic arylene hydrogen phosphite, both of which may be represented by the following keto-enol tautomeric structures:

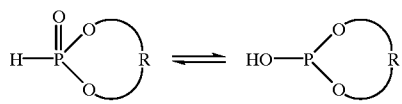

wherein R is a divalent alkylene or arylene group, or substituted alkylene or arylene group having from 2 to about 20 carbon atoms. The cyclic hydrogen phosphites exist mainly as the keto tautomer (shown on the left), with the enol tautomer (shown on the right) being the minor species. Both tautomers may be self associated in dimeric or trimeric forms by hydrogen bonding.

Examples of the cyclic alkylene hydrogen phosphites employed in the catalyst system of the present invention are 2-oxo-(2H)-5-butyl-5-ethyl-1,3,2-dioxaphosphorinane, 2-oxo-(2H)-5,5-dimethyl-1,3,2-dioxaphosphorinane, 2-oxo-(2H)-1,3,2-dioxaphosphorinane, 2-oxo-(2H)-4-methyl-1,3,2-dioxaphosphorinane, 2-oxo-(2H)-5-ethyl-5-methyl-1,3,2-dioxaphorinane, 2-oxo-(2H)-5,5-diethyl-1,3,2-dioxaphosphorinane, 2-oxo-(2H)-5-methyl-5-propyl-1,3,2-dioxaphosphorinane, 2-oxo-(2H)-4-isopropyl-5,5-dimethyl-1,3,2-dioxaphosphorinane, 2-oxo-(2H)-4,6-dimethyl-1,3,2-dioxaphosphorinane, 2-oxo-(2H)-4-propyl-5-ethyl-1,3,2-dioxaphosphorinane, 2-oxo-(2H)-4-methyl-1,3,2-dioxaphospholane, and 2-oxo-(2H)-4,5-dimethyl-1,3,2-dioxaphospholane.

Examples of the cyclic arylene hydrogen phosphites employed in the catalyst system of the present invention are 2-oxo-(2H)-4,5-benzo-1,3,2-dioxaphospholane, 2-oxo-(2H)-4,5-(3'-methylbenzo)-1,3,2-dioxaphospholane, 2-oxo-(2H)-4,5-(4'-methylbenzo)-1,3,2-dioxaphospholane, 2-oxo-(2H)-4,5-(4'-tert-butylbenzo)-1,3,2-dioxaphospholane, and 2-oxo-(2H)-4,5-naphthalo-1,3,2-dioxaphospholane.

The above-mentioned cyclic hydrogen phosphites employed in the catalyst system of the present invention may be prepared by the transesterification of an acyclic dihydrocarbyl hydrogen phosphite (usually dimethyl hydrogen phosphite or diethyl hydrogen phosphite) with a diol. The procedure for such transesterification is well known to those skilled in the prior art. Typically the transesterification is carried out by heating a mixture of the acyclic dihydrocarbyl hydrogen phosphite and the diol to effect the distillation of the alcohol eliminated (usually methanol or ethanol) and leave the new-made cyclic hydrogen phosphite.

The catalyst according to the present invention may be formed in situ by adding the three catalyst components to the monomer/solvent mixture in either a stepwise or simultaneous manner. The sequence in which the components are added in a stepwise manner is immaterial but the components are preferably added in the sequence of organomagnesium compound, chromium compound, and finally cyclic hydrogen phosphite. The three catalyst components may also be premixed outside the polymerization system and the resulting mixture then added to the polymerization system. The catalyst may also be preformed, that is, the three catalyst components are premixed in the presence of a small amount of 1,3-butadiene, prior to being charged to the main portion of the monomer/solvent mixture that is to be polymerized.

When a catalyst solution is prepared outside the polymerization system, the organic solvent usable for the catalyst component solution may be selected from aromatic hydrocarbons, aliphatic hydrocarbons and cycloaliphatic hydrocarbons, and mixtures of two or more of the above-mentioned hydrocarbons. Preferably, the organic solvent consists of at least one selected from benzene, toluene, xylene, hexane, heptane and cyclohexane.

The catalyst system of the present invention has polymerization activity over a wide range of total catalyst concentrations and catalyst component ratios. The catalyst components apparently interact to form the active catalytic species. As a result, the optimum concentration for any one catalyst component is dependent upon the concentrations of the other two catalyst components. While polymerization will occur over a wide range of catalyst concentrations and ratios, the polymers having the most desirable properties are obtained within a narrower range.

The molar ratio of the organomagnesium compound to the chromium compound (Mg/Cr) can be varied from about 2:1 to about 50:1. However, a preferred range of Mg/Cr molar ratio is from about 3:1 to about 20:1. The molar ratio of the cyclic hydrogen phosphite to the chromium compound (P/Cr) can be varied from about 0.5:1 to about 25:1, with a preferred range of P/Cr molar ratio being from about 1:1 to 10:1.

The total catalyst concentration in the polymerization mass depends on such factors as purity of the components, polymerization rate and conversion desired, and the polymerization temperature. Therefore, specific total catalyst concentrations cannot be definitively set forth except to say that catalytically effective amounts of the respective catalyst components should be used. Generally, the amount of the chromium compound used can be varied from 0.01 to 2 mmol per 100 g of 1,3-butadiene, with a preferred range being from about 0.05 to about 1.0 mmol per 100 g of 1,3-butadiene. Certain specific total catalyst concentrations and catalyst component ratios which produce polymers having desired properties are illustrated in the examples of the present invention.

The catalyst system of the present invention produces syndiotactic 1,2-polybutadiene having a higher melting temperature and increased syndiotacticity over the syndiotactic 1,2-polybutadiene products produced by the chromium-containing catalyst systems of the prior art.

In performing the polymerization, a molecular weight regulator may be employed to expand the scope of the polymerization system in such a manner that it can be used for the synthesis of syndiotactic 1,2-polybutadiene ranging from an extremely high molecular weight polymer to a low molecular weight polymer. Representative examples of such a molecular weight regulator are accumulated diolefins, such as allene and 1,2-butadiene, and nonconjugated diolefins such as 1,5-cyclooctadiene, 4-vinylcyclohexene, 1,4-pentadiene, 1,5-hexadiene, and 1,6-heptadiene. The amount of the molecular weight regulator used, expressed in parts per hundred by weight of the monomer (phm) 1,3-butadiene employed in the polymerization, is in the range of 0.01 to 1 phm and preferably in the range of 0.05 to 0.5 phm.

The polymerizations of this invention are usually carried out in inert organic solvents. Example of such solvents are aliphatic, cycloaliphatic, and aromatic hydrocarbons. The preferred solvents are hexanes, pentane, cyclohexane, methylcyclopentane, benzene, and toluene. Commercial mixtures of the above hydrocarbons may also be used. It will normally be desirable to select a solvent which is inert with respect to the catalyst system employed to initiate the polymerization reaction.

In the practice of this invention, a solution polymerization system may be employed in which both the monomer 1,3-butadiene to be polymerized and the polymer formed are soluble in the polymerization medium. Alternatively, a precipitation polymerization system may be employed by choosing a solvent in which the polymer formed is insoluble. In both cases, an amount of the organic solvent in addition to the organic solvent contained in the catalyst component solutions is added to the polymerization system. The additional organic solvent may be either the same as or different from the organic solvent contained in the catalyst component solutions. The concentration of the monomer 1,3-butadiene to be polymerized is not limited to a special range. However, generally, it is preferable that the concentration of the 1,3-butadiene in the polymerization reaction mixture be in a range of from 3% to 80% by weight, but a more preferred range is from about 5% to about 50% by weight, and the most preferred range is from about 10% to about 30% by weight.

The polymerization of the present invention may be carried out as a batch process, on a semicontinuous basis, or on a continuous basis. In any case, the polymerization is conducted under anaerobic conditions using an inert protective gas such as nitrogen, argon or helium, with moderate to vigorous agitation. The polymerization temperature employed in the practice of this invention may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the monomer 1,3-butadiene or the solvent, or a combination of the two methods. Although the polymerization pressure employed in the practice of this invention also may vary widely, a preferred pressure range is from about 1 atmosphere to about 10 atmospheres.

The polymerization reaction, on reaching to a desired degree, can be stopped by addition of a known polymerization terminator into the reaction system to inactivate the catalyst system, followed by the conventional steps of desolventization and drying as are typically employed and are known to those skilled in the art in the production of conjugated diene polymers. Typically, the terminator employed to inactivate the catalyst system is a protic compound such as an alcohol, a carboxylic acid, an inorganic acid, and water or a combination thereof An antioxidant such as 2,6-di-tert-butyl-4-methylphenol may be added along with, before or after addition of the terminator. The amount of the antioxidant employed is usually in the range of 0.2% to 1% by weight of the polymer product. When the polymerization reaction has been stopped, the syndiotactic 1,2-polybutadiene product may be isolated from the polymerization mixture by precipitation with an alcohol such as methanol, ethanol, or isopropanol or by steam distillation of the solvent and unreacted monomer, followed by filtration. The product is then dried under a constant vacuum at a temperature of about 25° C. to about 100° C. (preferably at about 60° C.).

The syndiotactic 1,2-polybutadiene produced using the process and the catalyst composition of the present invention preferably has a syndiotacticity of more than 70% and a melting temperature higher than about 120° C.

Syndiotactic 1,2-polybutadiene has many uses. Syndiotactic 1,2-polybutadiene can be incorporated into synthetic elastomers in order to improve the green strength of elastomers particularly in tires. The supporting carcass (reinforcing carcass) of tires is particularly prone to distortion during tire building and curing procedures. For this reason the incorporation of syndiotactic 1,2-polybutadiene into elastomers which are used as the supporting carcass for tires has particular utility. Syndiotactic 1,2-polybutadiene is also useful in the manufacture of food films and in many molding applications.

The practice of the present invention is further illustrated by reference to the following examples which however, should not be construed as limiting the scope of the invention. Parts and percentages shown in the examples are by weight unless otherwise indicated.

EXAMPLE 1

Dimethyl hydrogenphosphite (76.3 g, 0.693 mol) and 2-butyl-2-ethyl-1,3-propanediol (110.0 g, 0.687 mol) were charged into and mixed in a round bottom reaction flask connected to a distillation head and a receiving flask. The reaction flask was placed in an oil bath and heated to 150° C. under an atmosphere of argon. The transesterification reaction proceeded as indicated by the distillation of methanol. After about two hours of heating at 150° C., the remaining methanol and any unreacted starting materials were removed by vacuum distillation at 135° C. and at a pressure of 150 torr. The remaining crude product was distilled at 160° C. and at a pressure of 2 torr, yielding 2-oxo-(2H)-5-butyl-5-ethyl-1,3,2-dioxaphosphorinane as a very viscous, colorless liquid. (128.8 g, 0.625 mol). The identity of the product was confirmed by $^1$H and $^{31}$P NMR.

EXAMPLE 2

An oven dried one liter glass bottle was capped with a self-sealing rubber liner and a perforated metal cap and purged with a stream of dry nitrogen. The bottle was charged with 200 g of a 1,3-butadiene/hexanes blend (25/75 w/w) and 255 g of hexanes. The following catalyst components were added to the bottle in the following order: 0.35 mmol of MgBu$_2$, 0.050 mmol of chromium 2-ethylhexanoate, and 0.25 mmol of 2-oxo-(2H)-5-butyl-5-ethyl-1,3,2-dioxaphosphorinane. The 1,3-butadiene was polymerized as the bottle was tumbled for four hours in a water bath maintained at 50° C. The polymerization was terminated by addition of 10 ml of isopropanol containing 0.5 g of 2,6-di-tert-butyl-4-methylphenol. The polymerization mixture was added into three liters of isopropanol. The polymer was isolated by filtration and dried to a constant weight under vacuum at 60° C. The polymer yield was 24.4 g (49% conversion). The syndiotacticity of the recovered 1,2-polybutadiene was confirmed by the results of analysis by differential scanning calorimetry (DSC) and nuclear magnetic resonance (NMR). As measured by DSC, the polymer had a melting temperature of 130° C. $^1$H and $^{13}$C NMR analysis of the polymer indicated a 1,2-microstructure content of 80.1%, and a syndiotacticity of 72.2%. As determined by gel permeation chromatography, the polymer has a weight average molecular weight ($M_w$) of 818,000, a number average molecular weight ($M_n$) of 526,000, and a polydispersity index ($M_w/M_n$) of 1.6. The monomer charge, the amounts of catalyst components and the properties of the resultant syndiotactic 1,2-polybutadiene are summarized in Table I.

EXAMPLES 3 to 5

In Examples 3, 4 and 5, the procedure in Example 2 was repeated having the monomer and the catalyst ratio as shown in Table I. The monomer charge, the amounts of catalyst components and the properties of the resultant syndiotactic 1,2-polybutadiene produced in each example are summarized in Table I.

TABLE I

| Example No. | 2 | 3 | 4 | 5 |
| --- | --- | --- | --- | --- |
| 1,3-Bd/hexanes (25/75 w/w) (g) | 200 | 200 | 200 | 200 |
| Hexanes (g) | 255 | 255 | 255 | 255 |
| MgBu$_2$ (mmol) | 0.35 | 0.40 | 0.45 | 0.50 |
| Cr EHA (mmol) | 0.050 | 0.050 | 0.050 | 0.050 |
| Cyclic hydrogen phosphite (mmol)*[1] | 0.25 | 0.25 | 0.25 | 0.25 |
| Polymer yield (% conversion of monomer) after 4 hour at 50° C. | 49 | 54 | 58 | 43 |
| Melting point (° C.) | 130 | 128 | 130 | 130 |
| % 1,2-Vinyl | 80.1 | 80.2 | 80.0 | 79.5 |
| Syndiotacticity (%)*[2] | 72.2 | 72.6 | 72.5 | 72.3 |
| $M_w$ | 818,000 | 915,000 | 1,113,00 | 706,00 |
| $M_n$ | 526,000 | 481,000 | 622,000 | 504,000 |
| $M_w/M_n$ | 1.6 | 1.9 | 1.8 | 1.4 |

*[1]The cyclic hydogen phosphite used is 2-oxo-(2H)-5-butyl-5-ethyl-1,3,2-dioxaphosphorinane.
*[2]Expressed in the percentage of the racemic triad of the vinyl groups, excluding the vinyl groups adjacent to a monomer unit having a 1,4 microstructure.

EXAMPLES 6 to 9

In Examples 6, 7, 8 and 9, the procedure in Example 2 was repeated except that 2-oxo-(2H)-5,5-dimethyl-1,3,2-dioxaphosphorinane was substituted for 2-oxo-(2H)-5-butyl-5-ethyl-1,3,2-dioxaphosphorinane, having the monomer and the catalyst ratio as shown in Table II. The monomer charge, the amounts of catalyst components and the properties of the resultant syndiotactic 1,2-polybutadiene produced in each example are summarized in Table II.

TABLE II

| Example No. | 6 | 7 | 8 | 9 |
| --- | --- | --- | --- | --- |
| 1,3-Bd/hexanes (25/75 w/w) (g) | 200 | 200 | 200 | 200 |
| Hexanes (g) | 255 | 255 | 255 | 255 |
| MgBu$_2$ (mmol) | 0.35 | 0.40 | 0.45 | 0.50 |
| Cr EHA (mmol) | 0.050 | 0.050 | 0.050 | 0.050 |
| Cyclic hydrogen phosphite (mmol)*[1] | 0.25 | 0.25 | 0.25 | 0.25 |
| Polymer yield (% conversion) after 4 hours at 50° C. | 48 | 53 | 57 | 42 |
| Melting point (° C.) | 130 | 126 | 129 | 128 |
| % 1,2-Vinyl | 80.0 | 79.5 | 79.5 | 80.1 |
| Syndiotacticity (%)*[2] | 72.4 | 72.4 | 72.6 | 72.3 |
| $M_w$ | 806,000 | 1,024,000 | 1,078,00 | 813,00 |
| $M_n$ | 504,000 | 703,000 | 797,000 | 508,000 |
| $M_w/M_n$ | 1.6 | 1.5 | 1.4 | 1.6 |

*[1]The cyclic hydogen phosphite used is 2-oxo-(2H)-5,5-dimethyl-1,3,2-dioxaphosphorinane.
*[2]Expressed in the percentage of the racemic triad of the vinyl groups, excluding the vinyl groups adjacent to a monomer unit having a 1,4 microstructure.

Comparative Examples 10 and 11

In Comparative Examples 10 and 11, the procedure in Example 2 was repeated except that triethyl aluminum was substituted for dibutyl magnesium, bis(2-ethylhexyl) hydrogen phosphite was substituted for 2-oxo-(2H)-5-butyl-5-ethyl-1,3,2-dioxaphosphorinane, and the amounts of catalyst components were varied as shown in Table III. The properties of the resultant syndiotactic 1,2-polybutadiene produced in each example are summarized in Table III.

Comparative Examples 12 and 13

In Comparative Examples 12 and 13, the procedure in Example 2 was repeated except that triethyl aluminum was substituted for dibutyl magnesium, dineopentyl hydrogen phosphite was substituted for 2-oxo-(2H)-5-butyl-5-ethyl-1,3,2-dioxaphosphorinane, and the amounts of catalyst components were varied as shown in Table III. The properties of the resultant syndiotactic 1,2-polybutadiene produced in each example are summarized in Table III

TABLE III

| Example No. | 10 | 11 | 12 | 13 |
| --- | --- | --- | --- | --- |
| 1,3-Bd/hexanes (25/75 w/w) (g) | 200 | 200 | 200 | 201 |
| Hexanes (g) | 255 | 255 | 255 | 255 |
| AlEt$_3$ (mmol) | 0.20 | 0.30 | 0.50 | 0.75 |
| Cr EHA (mmol) | 0.050 | 0.050 | 0.050 | 0.050 |
| HP(O)(OCH$_2$CH(Et)(CH$_2$)$_3$CH$_3$)$_2$ (mmol) | 0.20 | 0.20 | 0 | 0 |
| HP(O)(OCH$_2$CMe$_3$)$_2$ (mmol) | 0 | 0 | 0.33 | 0.33 |
| Polymer yield (%) after 4 h at 50° C. | 70 | 92 | 97 | 96 |
| Melting point (° C.) | 79 | 78 | 100 | 97 |
| % 1,2-Vinyl | 80.1 | 80.0 | 83.1 | 81.1 |
| Syndiotacticity (%) | 57.0 | 57.2 | 64.0 | 66.5 |
| $M_w$ | 1,080,000 | 867,000 | 785,00 | 947,000 |
| $M_n$ | 481,000 | 273,000 | 272,000 | 658,000 |
| $M_w/M_n$ | 2.2 | 3.1 | 2.8 | 1.4 |

Comparison of the analytical data of the syndiotactic 1,2-polybutadiene products obtained in Examples 2–9 with the analytical data of the products obtained in Examples 10–13 indicates that the catalyst system of the present invention produces syndiotactic 1,2-polybutadiene of higher quality as shown by the significantly higher melting temperature and higher syndiotacticity than was obtained with the chromium-containing catalyst systems disclosed in the prior art.

EXAMPLES 14 to 17

In Examples 14 to 17, a series of polymerizations were carried out to evaluate 1,2-butadiene as a molecular weight regulator. The procedure is essentially identical to that described in Example 2 except that various amounts of 1,2-butadiene were added to a polymerization bottle containing the monomer solution before addition of the catalyst components. The monomer charge, the amounts of catalyst components and the properties of the resultant syndiotactic 1,2-polybutadiene produced in each example are summarized in Table IV.

TABLE IV

| Example No. | 14 | 15 | 16 | 17 |
|---|---|---|---|---|
| 1,3-Bd/hexanes (25/75 w/w) (g) | 300 | 300 | 300 | 300 |
| 1,2-Bd (phm) | 0.05 | 0.10 | 0.20 | 0.30 |
| MgBu$_2$ (mmol) | 0.675 | 0.675 | 0.675 | 0.675 |
| Cr EHA (mmol) | 0.075 | 0.075 | 0.075 | 0.075 |
| Cyclic hydrogen phosphite (mmol)*[1] | 0.375 | 0.375 | 0.375 | 0.375 |
| Polymer yield (%) after 4 h at 50° C. | 40 | 35 | 29 | 21 |
| Melting point (° C.) | 126 | 127 | 129 | 129 |
| M$_w$ | 569,000 | 434,000 | 282,000 | 221,000 |
| M$_n$ | 294,000 | 208,000 | 130,000 | 105,000 |
| M$_w$/M$_n$ | 1.9 | 2.1 | 2.2 | 2.1 |

*[1]The cyclic hydogen phosphite used is 2-oxo-(2H)-5-butyl-5-ethyl-1,3,2 dioxaphosphorinane.

Although the present invention has been described in the above with reference to particular means, materials and embodiments, it would be obvious to persons skilled in the art that various changes and modifications may be made, which fall within the scope claimed for the invention as set out in the appended claims. The invention is therefore not limited to the particulars disclosed and extends to all equivalents within the scope of the claims.

I claim:

1. A method for forming a syndiotactic 1,2-polybutadiene product, comprising:
    polymerizing 1,3-butadiene in a hydrocarbon solvent, in the presence of a catalyst composition formed by combining catalytically effective amounts of:
    (a) a chromium compound;
    (b) an organomagnesium compound; and,
    (c) a cyclic hydrogen phosphite selected from cyclic alkylene hydrogen phosphites or cyclic arylene hydrogen phosphites.

2. The method of claim 1, wherein the chromium compound and the organomagnesium compound are soluble in the hydrocarbon solvent.

3. The method of claim 1, wherein the amount of the chromium compound ranges from 0.01 to 2 mmol per 100 g of 1,3-butadiene, the molar ratio of the organomagnesium compound to the chromium compound ranges from about 2:1 to about 50:1 and the molar ratio of the cyclic hydrogen phosphite to the chromium compound ranges from about 0.5:1 to about 25:1.

4. The method of claim 1, wherein the syndiotactic 1,2-polybutadiene has a syndiotacticity of more than 70% and a melting temperature of more than about 120° C.

5. The method of claim 1, wherein the polymerization of said method is conducted under agitation at a temperature of between about −10° C. to about 100° C. under an inert protective gas.

6. The method of claim 1, wherein the polymerization of said method is conducted in the presence of a molecular weight regulator.

7. The method of claim 1, wherein said organomagnesium compound is a dihydrocarbyl magnesium or a hydrocarbyl magnesium halide.

8. The method of claim 1, wherein said organomagnesium compound is represented by the formula MgR$_2$; wherein each R represents the same or different groups and is selected from the group consisting of: alkyl, cycloalkyl, aryl, aralkyl, and allyl groups.

9. The method of claim 1, wherein said organomagnesium compound is represented by the formula RMgX; wherein R is selected from the group consisting of: alkyl, cycloalkyl, aryl, aralkyl, and allyl; and, X is selected from the group consisting of fluorine, chlorine, bromine and iodine.

10. The method of claim 1, wherein said chromium compound is selected from the group consisting of: chromium 2-ethylhexanoate, chromium neodecanoate, chromium naphthenate, chromium stearate, chromium oleate, chromium benzoate, chromium tris(acetylacetonate), chromium tris(trifluoroacetylacetonate), chromium tris(hexafluoroacetylacetonate), chromium tris(benzoylacetonate), chromium tris(2,2,6,6-tetramethyl-3,5-heptanedionate), chromium ethoxide, chromium isopropoxide, chromium 2-ethylhexoxide, chromium phenoxide, chromium nonylphenoxide, and chromium naphthoxide, tris(allyl)chromium, tris(methally)chromium, tris(crotyl)chromium, bis(cyclopentadienyl)chromium, bis(pentamethylcyclopentadienyl)-chromium, bis(benzene) chromium, bis(ethylbenzene)chromium, and bis (mesitylene)chromium.

11. The method of claim 1, wherein said cyclic hydrogen phosphite is of the general tautomeric structures:

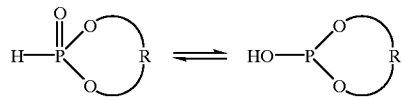

wherein R is selected from the group consisting of a divalent alkylene or arylene group, or substituted alkylene or arylene group having from 2 to about 20 carbon atoms.

12. The method of claim 1, wherein said cyclic hydrogen phosphite is a cyclic alkylene hydrogen phosphite selected from the group consisting of: 2-oxo-(2H)-5-butyl-5-ethyl-1, 3,2-dioxaphosphorinane, 2-oxo-(2H)-5,5-dimethyl-1,3,2-dioxaphosphorinane, 2-oxo-(2H)-1,3,2-dioxaphosphorinane, 2-oxo-(2H)-4-methyl-1,3,2-dioxaphosphorinane, 2-oxo-(2H)-5-ethyl-5-methyl-1,3,2-dioxaphosphorinane, 2-oxo-(2H)-5,5-diethyl-1,3,2-dioxaphosphorinane, 2-oxo-(2H)-5-methyl-5-propyl-1,3,2-dioxaphosphorinane, 2-oxo-(2H)-4-isopropyl-5,5-dimethyl-1,3,2-dioxaphosphorinane, 2-oxo-(2H)-4,6-dimethyl-1,3,2-dioxaphosphorinane, 2-oxo-(2H)-4-methyl-1,3,2-dioxaphospholane, and 2-oxo-(2H)-4,5-dimethyl-1,3,2-dioxaphospholane.

13. The method of claim 1, wherein said cyclic hydrogen phosphite is a cyclic arylene hydrogen phosphite selected from the group consisting of: 2-oxo-(2H)-4,5-(3'-methylbenzo)-1,3,2-dioxaphospholane, 2-oxo-(2H)-4,5-(4'-methylbenzo)-1,3,2-dioxaphospholane, 2-oxo-(2H)-4,5-(4'-tert-butylbenzo)-1,3,2-dioxaphospholane, and 2-oxo-(2H)-4,5-naphthalo-1,3,2-dioxaphospholane.

14. A catalyst composition that is the combination of or the reaction product of ingredients comprising:
    (a) a chromium compound;
    (b) an organomagnesiun compound; and,
    (c) a cyclic hydrogen phosphite selected from cyclic alkylene hydrogen phosphites or cyclic arylene hydrogen phosphites.

15. The catalyst composition of claim 14, wherein said organomagnesium compound is a dihydrocarbyl magnesium or a hydrocarbyl magnesium halide.

16. The catalyst composition of claim 14, wherein said organomagnesium compound is represented by the formula MgR$_2$; wherein each R represents the same or different groups and is selected from the group consisting of: alkyl, cycloalkyl, aryl, aralkyl, and allyl groups.

17. The catalyst composition of claim 14, wherein said organomagnesium compound is represented by the formula RMgX; wherein R is selected from the group consisting of: alkyl, cycloalkyl, aryl, aralkyl, and allyl; and, X is selected from the group consisting of fluorine, chlorine, bromine and iodine.

18. The catalyst composition of claim 14, wherein said chromium compound is selected from the group consisting of chromium 2-ethylhexanoate, chromium neodecanoate, chromium naphthenate, chromium stearate, chromium oleate, chromium benzoate, chromium tris(acetylacetonate), chromium tris(trifluoroacetylacetonate), chromium tris (hexafluoroacetylacetonate), chromium tris (benzoylacetonate), chromium tris(2,2,6,6-tetramethyl-3,5-heptanedionate), chromium ethoxide, chromium isopropoxide, chromium 2-ethylhexoxide, chromium phenoxide, chromium nonylphenoxide, and chromium naphthoxide, tris(allyl)chromium, tris(methally)chromium, tris(crotyl)chromium, bis(cyclopentadienyl)chromium, bis (pentamethylcyclopentadienyl)chromium, bis(benzene) chromium, bis(ethylbenzene)chromium, and bis (mesitylene)chromium.

19. The catalyst composition of claim 14, wherein said cyclic hydrogen phosphite is of the general tautomeric structures:

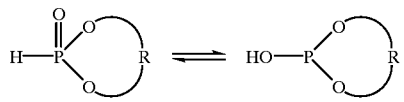

wherein R is selected from the group consisting of a divalent alkylene or arylene group, or substituted alkylene or arylene group having from 2 to about 20 carbon atoms.

20. The catalyst composition of claim 14, wherein said cyclic hydrogen phosphite is a cyclic alkylene hydrogen phosphite selected from the group consisting of: 2-oxo-(2H)-5-butyl-5-ethyl-1,3,2-dioxaphosphorinane, 2-oxo-(2H)-5,5-dimethyl-1,3,2-dioxaphosphorinane, 2-oxo-(2H)-1,3,2-dioxaphosphorinane, 2-oxo-(2H)-4-methyl-1,3,2-dioxaphosphorinane, 2-oxo-(2H)-5-ethyl-5-methyl-1,3,2-dioxaphosphorinane, 2-oxo-(2H)-5,5-diethyl-1,3,2-dioxaphosphorinane, 2-oxo-(2H)-5-methyl-5-propyl-1,3,2-dioxaphosphorinane, 2-oxo-(2H)-4-isopropyl-5,5-dimethyl-1,3,2-dioxaphosphorinane, 2-oxo-(2H)-4,6-dimethyl-1,3,2-dioxaphosphorinane, 2-oxo-(2H)-4-methyl-1,3,2-dioxaphospholane, and 2-oxo-(2H)-4,5-dimethyl-1,3,2-dioxaphospholane.

21. The catalyst composition of claim 14, wherein said cyclic hydrogen phosphite is a cyclic arylene hydrogen phosphite selected from the group consisting of: 2-oxo-(2H)-4,5-(3'-methylbenzo)-1,3,2-dioxaphospholane, 2-oxo-(2H)-4,5-(4'-methylbenzo)-1,3,2-dioxaphospholane, 2-oxo-(2H)-4,5-(4'-tert-butylbenzo)-1,3,2-dioxaphospholane, and 2-oxo-(2H)-4,5-naphthalo-1,3,2-dioxaphospholane.

22. The catalyst composition of claim 14, in which the molar ratio of the organomagnesium compound to the chromium compound ranges from about 2:1 to about 50:1 and the molar ratio of the cyclic hydrogen phosphite to the chromium compound ranges from about 0.5:1 to about 25:1.

23. A catalyst composition formed by the process comprising the step of:

combining
(a) a chromium compound;
(b) an organomagnesium compound; and,
(c) a cyclic hydrogen phosphite selected from cyclic alkylene hydrogen phosphites or cyclic arylene hydrogen phosphites.

* * * * *